US009889996B2

(12) United States Patent
Bondeson et al.

(10) Patent No.: US 9,889,996 B2
(45) Date of Patent: Feb. 13, 2018

(54) ADHESIVE MELTER AND METHOD HAVING PREDICTIVE MAINTENANCE FOR EXHAUST AIR FILTER

(71) Applicant: NORDSON CORPORATION, Westlake, OH (US)

(72) Inventors: Benjamin J. Bondeson, Suwanee, GA (US); Justin A. Clark, Buford, GA (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 15/402,862

(22) Filed: Jan. 10, 2017

(65) Prior Publication Data

US 2017/0113883 A1 Apr. 27, 2017

Related U.S. Application Data

(63) Continuation of application No. 13/953,032, filed on Jul. 29, 2013, now Pat. No. 9,574,714.

(51) Int. Cl.
*B65G 53/66* (2006.01)
*B65G 53/16* (2006.01)
(Continued)

(52) U.S. Cl.
CPC ............. *B65G 53/66* (2013.01); *B65G 53/16* (2013.01); *B65G 53/60* (2013.01); *F17D 3/00* (2013.01)

(58) Field of Classification Search
CPC ...... B65G 53/16; B65G 53/66; B65G 53/521; B65G 65/32; B65G 2207/02; F17D 1/18
(Continued)

(56) References Cited

U.S. PATENT DOCUMENTS 2,672,215 A 3/1954 Otto Schmid
2,744,792 A 5/1956 Finn
(Continued)

FOREIGN PATENT DOCUMENTS

CN 202116049 U 1/2012
DE 3815089 A1 11/1989
(Continued)

OTHER PUBLICATIONS

United States Patent and Trademark Office, Non-Final Office Action issued in corresponding U.S. Appl. No. 13/799,788 (dated Jun. 12, 2014) (24 pages).
(Continued)

*Primary Examiner* — Joseph Dillon, Jr.
(74) *Attorney, Agent, or Firm* — Baker & Hostetler LLP

(57) ABSTRACT

An adhesive melter and a method for operating the adhesive melter enables predictive maintenance of an exhaust air filter used to remove pressurized air flow that delivers solid adhesive particulate from a fill system into the melter. To this end, the fill system repeatedly actuates to refill a receiving space, and a controller monitors a duration of each fill system cycle. When changes in a calculated average duration of a plurality of fill system cycles exceed a maintenance threshold, an alert is emitted at a user interface to prompt maintenance or replacement of the exhaust air filter before a complete shutdown of the fill system is caused by clogging of the exhaust air filter. Consequently, unplanned downtimes caused by clogged exhaust air filters in the adhesive melter can be minimized, regardless of any variable conditions occurring at the melter.

19 Claims, 5 Drawing Sheets

(51) Int. Cl.
*B65G 53/60* (2006.01)
*F17D 3/00* (2006.01)

(58) Field of Classification Search
USPC .............................. 406/10, 34, 171, 172, 175
See application file for complete search history.

(56) References Cited

U.S. PATENT DOCUMENTS 2,824,335 A 2/1958 Moffat
2,868,015 A 1/1959 Haropulos
3,030,153 A 4/1962 Krenke et al.
3,219,394 A 11/1965 Moss et al.
3,377,861 A 4/1968 Thaler et al.
3,580,644 A 5/1971 Ballard
3,756,456 A 9/1973 Georgi
3,773,069 A 11/1973 Rebentisch
3,981,416 A 9/1976 Scholl
4,066,188 A 1/1978 Scholl et al.
4,084,628 A 4/1978 Schmid
4,086,466 A 4/1978 Scharlack
4,277,773 A 7/1981 Blatnik
4,417,675 A 11/1983 Abt et al.
4,437,581 A 3/1984 Coker
4,441,450 A 4/1984 Dettelbach et al.
4,474,311 A 10/1984 Petrecca
4,479,600 A 10/1984 Albright
4,482,367 A * 11/1984 Howeth ............. B01D 46/0005 406/172
4,492,079 A 1/1985 Takagi et al.
4,583,885 A 4/1986 Thiele
4,613,059 A * 9/1986 Merkel ................... B05B 15/02 222/52
4,688,432 A 8/1987 Marsh
4,821,922 A 4/1989 Miller et al.
4,850,425 A 7/1989 Anderson
4,898,527 A 2/1990 Claassen
4,994,984 A 2/1991 Massimo
5,006,018 A 4/1991 Depew
5,047,798 A 9/1991 Yamamoto et al.
5,174,472 A 12/1992 Raque et al.
5,287,086 A 2/1994 Gibb
5,294,218 A 3/1994 Fiorentini et al.
5,332,366 A 7/1994 Anderson
5,347,867 A 9/1994 Pangerl
5,475,619 A 12/1995 Sugano et al.
5,589,203 A 12/1996 Sato
5,598,973 A 2/1997 Weston
5,680,961 A 10/1997 Boccagno et al.
5,715,972 A 2/1998 Siddiqui
5,747,689 A 5/1998 Hampo et al.
5,782,410 A 7/1998 Weston
5,791,830 A 8/1998 Fort et al.
5,909,829 A 6/1999 Wegman et al.
6,039,513 A 3/2000 Law
6,066,194 A * 5/2000 Hugghins ................. B03C 3/36 55/473
6,073,488 A 6/2000 Byatt et al.
6,095,803 A * 8/2000 Slater .................. B05C 11/1042 222/146.2
6,135,168 A * 10/2000 Yang ................. H01L 21/67373 141/91
6,146,057 A 11/2000 Gromley et al.
6,152,656 A 11/2000 Curtis et al.
6,175,101 B1 1/2001 Miller et al.
6,230,936 B1 5/2001 Lasko
6,318,599 B2 11/2001 Estelle et al.
6,352,173 B1 3/2002 Duckworth
6,380,861 B2 4/2002 Estelle et al.
6,471,751 B1 10/2002 Semanderes et al.
6,616,721 B2 9/2003 Oh
6,770,142 B2 8/2004 Estelle
7,263,781 B2 9/2007 Sielemann
7,626,143 B2 * 12/2009 Miller ..................... B05C 5/001 219/421
7,797,926 B2 * 9/2010 Nishino .................. F01N 11/00 60/273
7,947,929 B2 5/2011 Oh et al.
8,083,841 B2 * 12/2011 Cheng ................ B01D 46/0023 55/467
8,146,265 B2 4/2012 Oh et al.
8,157,483 B2 4/2012 Volkmann
8,201,717 B2 6/2012 Varga et al.
8,383,991 B2 2/2013 Saunders
8,430,230 B1 4/2013 Babcock
8,580,006 B2 11/2013 Lacroix
8,864,890 B2 10/2014 Sakuragi et al.
8,899,884 B2 * 12/2014 Kretschmer ............. C10J 3/723 406/10
8,902,071 B2 12/2014 Barton et al.
8,992,132 B2 3/2015 Rapoport et al.
8,994,539 B2 3/2015 Grohman et al.
9,110,040 B2 * 8/2015 Okada ................ G01N 33/0004
9,169,088 B2 * 10/2015 Chau ......................... B04C 5/13
9,304,028 B2 4/2016 Clark et al.
9,468,877 B2 * 10/2016 Miyai .................. G01N 1/2247
9,574,714 B2 2/2017 Bondeson et al.
2001/0023880 A1 9/2001 Estelle et al.
2002/0079325 A1 * 6/2002 Estelle ................ B05C 11/1021 222/1
2003/0021700 A1 1/2003 Serafin et al.
2003/0047076 A1 * 3/2003 Liu ........................... B07B 1/00 95/282
2003/0080154 A1 5/2003 Jeter
2003/0080156 A1 5/2003 Jeter et al.
2004/0000069 A1 * 1/2004 Gurol ...................... B02C 13/18 34/592
2004/0055739 A1 3/2004 Suckow et al.
2004/0167738 A1 8/2004 Miller
2005/0161158 A1 7/2005 Schumacher
2005/0219872 A1 10/2005 Lys
2005/0274740 A1 12/2005 Duckworth et al.
2006/0055503 A1 3/2006 Tanida
2006/0159565 A1 7/2006 Sanwald
2006/0289560 A1 12/2006 Bourget et al.
2007/0080157 A1 4/2007 Mehaffy et al.
2007/0216424 A1 9/2007 Sieh et al.
2008/0095637 A1 4/2008 Burdi et al.
2008/0120046 A1 5/2008 Tung et al.
2008/0145248 A1 6/2008 Kato et al.
2008/0156801 A1 7/2008 Tung et al.
2008/0196512 A1 8/2008 Miller
2008/0199323 A1 8/2008 Bauck et al.
2008/0206066 A1 8/2008 Nguyen et al.
2008/0282795 A1 11/2008 Zabel et al.
2008/0302477 A1 12/2008 Varga et al.
2009/0229359 A1 9/2009 Reimelt et al.
2009/0229683 A1 9/2009 Baek et al.
2009/0285983 A1 * 11/2009 Baldauf .............. B05C 11/1002 427/207.1
2010/0043643 A1 * 2/2010 Cheng ................ B01D 46/0023 96/418
2010/0180465 A1 * 7/2010 Noviello ................. D06F 58/20 34/467
2010/0282088 A1 11/2010 Deuber et al.
2011/0000309 A1 1/2011 Griffiths et al.
2011/0002793 A1 1/2011 Bauck et al.
2011/0042408 A1 2/2011 Giordano et al.
2011/0079078 A1 4/2011 Ho et al.
2011/0100120 A1 5/2011 Neuburger et al.
2011/0120104 A1 * 5/2011 Masuda ............... B01D 53/944 60/311
2012/0051945 A1 3/2012 Orndorff et al.
2012/0125206 A1 5/2012 Yamane
2012/0130532 A1 5/2012 Toyota
2012/0167555 A1 * 7/2012 Frazier .................. B60W 10/06 60/274
2012/0193334 A1 8/2012 Mehn et al.
2012/0223094 A1 9/2012 Rickard, Jr. et al.
2012/0227484 A1 9/2012 Chen et al.
2012/0247665 A1 10/2012 Varga et al.
2012/0273071 A1 11/2012 Kai

(56) References Cited

U.S. PATENT DOCUMENTS

| | | | | |
|---|---|---|---|---|
| 2012/0298696 | A1* | 11/2012 | Milo | G01F 11/04 222/250 |
| 2013/0105003 | A1 | 5/2013 | Quam et al. | |
| 2013/0105004 | A1 | 5/2013 | Tix et al. | |
| 2013/0105005 | A1 | 5/2013 | Tix et al. | |
| 2013/0105039 | A1 | 5/2013 | Tix et al. | |
| 2013/0105517 | A1 | 5/2013 | Tix et al. | |
| 2013/0105526 | A1 | 5/2013 | Ross et al. | |
| 2013/0112279 | A1 | 5/2013 | Ross et al. | |
| 2013/0112280 | A1 | 5/2013 | Quam et al. | |
| 2013/0112294 | A1 | 5/2013 | Ross et al. | |
| 2013/0112312 | A1 | 5/2013 | Ross et al. | |
| 2013/0112709 | A1 | 5/2013 | Ross et al. | |
| 2013/0112710 | A1 | 5/2013 | Ross et al. | |
| 2013/0112711 | A1 | 5/2013 | Lind et al. | |
| 2013/0115016 | A1 | 5/2013 | Ross et al. | |
| 2013/0205893 | A1 | 8/2013 | Shearer et al. | |
| 2013/0269662 | A1* | 10/2013 | Kuhn | F02M 25/07 123/568.11 |
| 2013/0312615 | A1* | 11/2013 | Miyai | G01N 1/2247 96/400 |
| 2014/0020463 | A1 | 1/2014 | Ikeya et al. | |
| 2014/0079493 | A1* | 3/2014 | Chau | B04C 5/13 406/173 |
| 2015/0027546 | A1 | 1/2015 | Bondeson et al. | |
| 2015/0217226 | A1 | 8/2015 | Roark et al. | |
| 2015/0315950 | A1* | 11/2015 | Hagimoto | F01N 3/023 73/114.75 |
| 2015/0339875 | A1 | 11/2015 | Yasunaga et al. | |
| 2016/0009504 | A1 | 1/2016 | Chau et al. | |
| 2016/0122138 | A1* | 5/2016 | Mauchle | B05B 7/1459 406/14 |

FOREIGN PATENT DOCUMENTS

| | | | |
|---|---|---|---|
| DE | 19923410 | A1 | 11/1999 |
| DE | 10156691 | A1 | 5/2003 |
| EP | 0072679 | A1 | 2/1983 |
| EP | 1350743 | A1 | 10/2003 |
| EP | 2119509 | A2 | 11/2009 |
| FR | 1366936 | A | 7/1964 |
| FR | 2787770 | A1 | 6/2000 |
| GB | 1562562 | A | 3/1980 |
| WO | 98/14314 | A1 | 4/1998 |
| WO | 2009/046545 | A1 | 4/2009 |
| WO | 2012/095838 | A1 | 7/2012 |

OTHER PUBLICATIONS

Meltex GmbH; Product Information Sheet; Hot Melt Applicator MX 2003; 2 pages.

Meltex GmbH; Product Information Sheet; Hot Melt Applicator MX 2001; 2 pages.

Meltex Corporation; Product Information Sheet; Hot Melt Applicator MP 400; 1 page.

Fluid-Air Products Inc., InvisiPac, Jan. 5, 2013.

European Patent Office, Extended European Search Report in EP Patent Application No. 13185893.8, dated Apr. 1, 2015 (6 pages).

European Patent Office, Extended European Search Report in EP Patent Application No. 13185184, dated Jun. 6, 2014 (7 pages).

European Patent Office, Extended European Search Report in corresponding European Patent Application No. 13187639.3, dated Feb. 28, 2014 (5 pages).

European Patent Office, European Search Report in corresponding European Patent Application No. 13184144.7 dated Mar. 25, 2014 (6 pages).

* cited by examiner

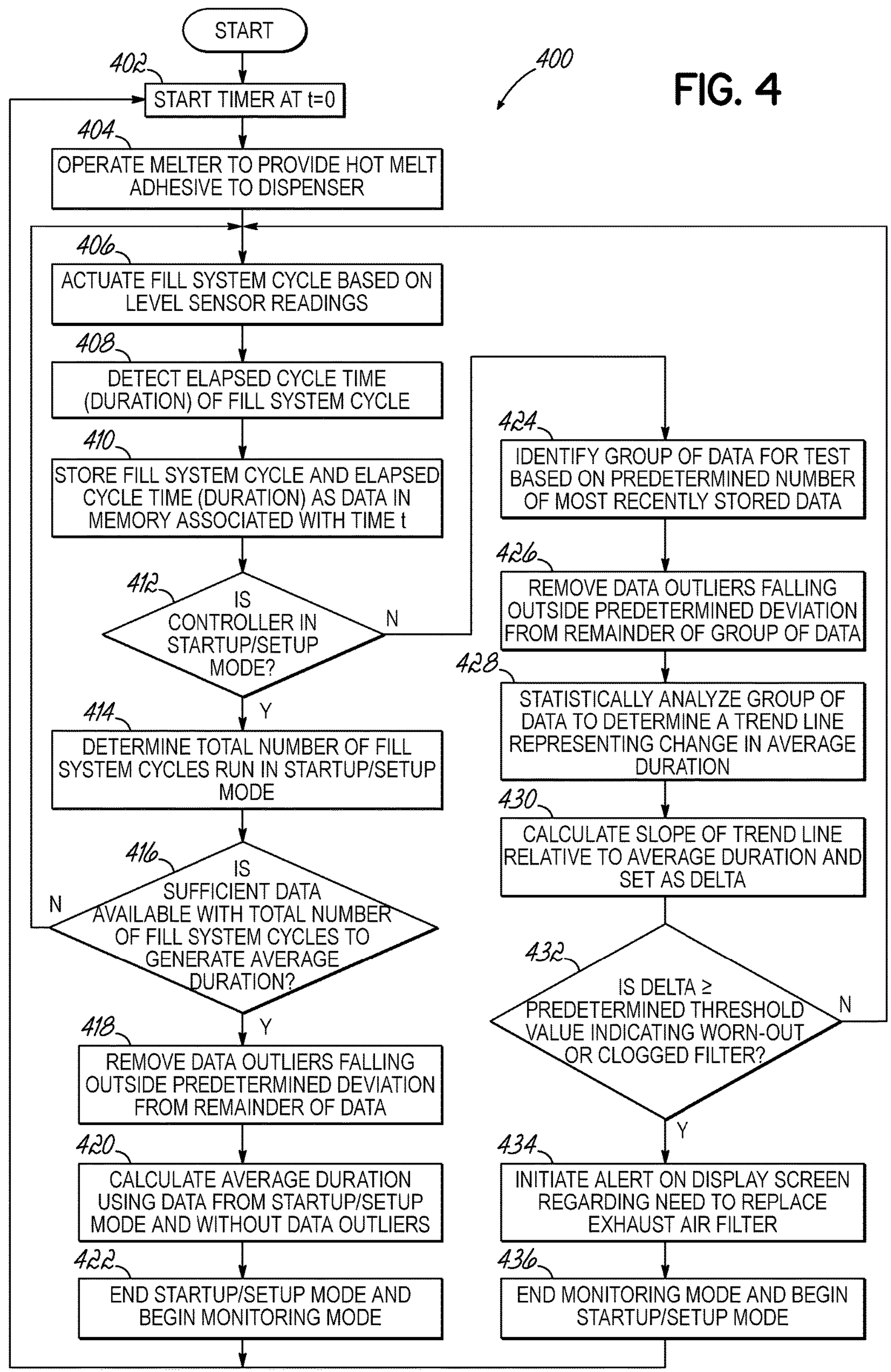

FIG. 4
400
START
402
START TIMER AT t=0
404
OPERATE MELTER TO PROVIDE HOT MELT ADHESIVE TO DISPENSER
406
ACTUATE FILL SYSTEM CYCLE BASED ON LEVEL SENSOR READINGS
408
DETECT ELAPSED CYCLE TIME (DURATION) OF FILL SYSTEM CYCLE
410
STORE FILL SYSTEM CYCLE AND ELAPSED CYCLE TIME (DURATION) AS DATA IN MEMORY ASSOCIATED WITH TIME t
412
IS CONTROLLER IN STARTUP/SETUP MODE?
N
Y
414
DETERMINE TOTAL NUMBER OF FILL SYSTEM CYCLES RUN IN STARTUP/SETUP MODE
416
IS SUFFICIENT DATA AVAILABLE WITH TOTAL NUMBER OF FILL SYSTEM CYCLES TO GENERATE AVERAGE DURATION?
N
Y
418
REMOVE DATA OUTLIERS FALLING OUTSIDE PREDETERMINED DEVIATION FROM REMAINDER OF DATA
420
CALCULATE AVERAGE DURATION USING DATA FROM STARTUP/SETUP MODE AND WITHOUT DATA OUTLIERS
422
END STARTUP/SETUP MODE AND BEGIN MONITORING MODE
424
IDENTIFY GROUP OF DATA FOR TEST BASED ON PREDETERMINED NUMBER OF MOST RECENTLY STORED DATA
426
REMOVE DATA OUTLIERS FALLING OUTSIDE PREDETERMINED DEVIATION FROM REMAINDER OF GROUP OF DATA
428
STATISTICALLY ANALYZE GROUP OF DATA TO DETERMINE A TREND LINE REPRESENTING CHANGE IN AVERAGE DURATION
430
CALCULATE SLOPE OF TREND LINE RELATIVE TO AVERAGE DURATION AND SET AS DELTA
432
IS DELTA ≥ PREDETERMINED THRESHOLD VALUE INDICATING WORN-OUT OR CLOGGED FILTER?
N
Y
434
INITIATE ALERT ON DISPLAY SCREEN REGARDING NEED TO REPLACE EXHAUST AIR FILTER
436
END MONITORING MODE AND BEGIN STARTUP/SETUP MODE

ADHESIVE MELTER AND METHOD HAVING PREDICTIVE MAINTENANCE FOR EXHAUST AIR FILTER

CROSS REFERENCE TO RELATED APPLICATIONS

This application is a continuation application of U.S. patent application Ser. No. 13/953,032, filed Jul. 29, 2013, and published as U.S. Patent Application Pub. No. 2015/0027546 on Jan. 29, 2015, which is incorporated by reference herein in its entirety.

FIELD OF THE INVENTION

The present invention generally relates to an adhesive melter used with an adhesive dispensing system, and more particularly, to control components and methods used to monitor and operate a fill system supplying solid adhesive to the adhesive melter.

BACKGROUND

A conventional dispensing system for supplying heated adhesive (i.e., a hot-melt adhesive dispensing system) generally includes a melter having an inlet for receiving adhesive materials in solid or semi-solid form, a heater grid in communication with the inlet for heating and/or melting the adhesive materials, and an outlet in communication with the heater grid for receiving the heated adhesive from the heated grid. The outlet communicates with a pump for driving and controlling the dispensation of the heated adhesive through the outlet and to downstream equipment, such as dispensing modules. Furthermore, conventional dispensing systems generally include a controller (e.g., a processor and a memory) and input controls electrically connected to the controller to provide a user interface with the dispensing system. The controller is in communication with one or more of the melter, the pump, and other components, such that the controller controls the dispensation of the heated adhesive.

Conventional hot-melt adhesive dispensing systems typically operate at ranges of temperatures sufficient to melt the received adhesive and heat the adhesive to an elevated application temperature prior to dispensing the heated adhesive. In order to ensure that the demand for heated adhesive from the gun(s) and module(s) is satisfied, the adhesive dispensing systems are designed with the capability to generate a predetermined maximum flow of molten adhesive. For example, the inlet of the melter communicates with a fill system operated by the controller of the dispensing system. In a typical arrangement, the fill system operates to deliver a stream of solid particulate or pelletized adhesive using a pressurized air flow from a bulk supply or source of the solid adhesive to the inlet of the melter whenever a receiving space (e.g., hopper) above the heater grid requires refilling. In these arrangements, the melter also includes an exhaust outlet with a filter for discharging the pressurized air flow from the fill system or receiving space after that pressurized air flow has delivered the solid adhesive into the receiving space. Thus, each fill system cycle requires the exhausting of pressurized air flow out of the melter.

As readily understood, the exhaust air filter will become clogged over time as the fill system is used. This clogging of the exhaust air filter stifles the efficient operation of the fill system because it can limit the amount of pressurized air flow generated through the fill system and the melter.

Conventional adhesive melters and dispensing systems do not specifically monitor the use of the exhaust air filter, so there is currently no known mechanism in this field to provide predictive maintenance information to an operator regarding when the exhaust air filter will need to be replaced. Instead, conventional systems typically continue to operate until the exhaust air filter is so clogged that the fill system effectively cannot keep up with the demands for molten adhesive from the melter, such as when the dispensing system requires the predetermined maximum flow of molten adhesive. Alternatively, the fill system may also stop working for other reasons such as a burst hose in the fill system or an obstruction of flow at the source of adhesive. As a result, a shutdown of the fill system occurs, which can eventually lead to the melter running out of adhesive and shutting down as well. Therefore, the adhesive dispensing system undergoes a period of unplanned downtime until maintenance personnel can identify the issue with the clogged exhaust air filter (or the other issues described above, when applicable) and then perform appropriate maintenance, such as a replacement of the exhaust air filter. These unplanned downtimes for the system are undesirable and costly for operators of conventional adhesive melters and dispensing systems.

In other pneumatic fields such as HVAC systems, air filters have been monitored using air flow measurement devices and/or pressure detection sensors that provide estimates of how much air flow moves through the air filter. The air filters in these other fields are then replaced after a set amount of air flow has passed through the air filter. While this type of equipment could hypothetically be used in the conventional adhesive melters, this equipment has not been added for multiple reasons. First, the additional air flow measurement devices and/or pressure detection sensors add additional cost to the manufacturing and maintenance of the adhesive melter, and this additional cost may outweigh the benefit of attempting to provide predictive maintenance information about the exhaust air filter at the adhesive melter. Second, these types of predictive maintenance based on total air flow through the exhaust air filter are unreliable in this context because exhaust air filters in adhesive melters are subject to highly variable conditions that may significantly alter the lifespan or total air flow that the exhaust air filter can pass through before clogging. Thus, merely measuring the total air flow through an exhaust air filter at an adhesive melter is not a reliable method for accurately determining when the exhaust air filter will become clogged, and unplanned downtimes for the adhesive melter would likely still occur.

The highly variable conditions that subject the exhaust air filters to unpredictable lifespan include the use of different adhesive materials or variable pellet shapes/form factors with filters, as these different materials or form factors can affect the amount of air flow required to move the solid adhesive. In another example, the length of hose used between the source of adhesive for the fill system and the melter may also affect the cycle time for a fill system and the lifespan of an exhaust air filter. In some instances, a more significant source of unpredictability in the lifespan of exhaust air filters is the selective use of powder that may be put on the solid adhesive to prevent tackiness and sticking together of the pellets or particles before delivery to the receiving space. This powder causes more rapid clogging of the exhaust air filter at the melter, thereby shortening the lifespan of the exhaust air filter. Furthermore, the use of powder on certain batches of solid adhesive delivered to the bulk supply from which the fill system draws solid adhesive is unpredictable because not every batch of solid adhesive may include the powder (e.g., the powder may only be used at hotter times of the year when the adhesive supplier and the ambient conditions at the bulk supply may be more prone to pellets sticking together). The amount of powder on the adhesive that will be captured by the exhaust air filter may also vary dramatically even between different batches or fill system cycles. As a result, it is currently impractical to reliably predict when an exhaust air filter in a conventional adhesive melter will require replacement. Furthermore, there is currently no known method for distinguishing reduced performance of the fill system caused by exhaust air filter clogging from reduced performance of the fill system caused by other problems such as burst hoses or adhesive supply obstructions.

For reasons such as these, an improved adhesive melter and method of operation, including a control process for accurately predicting and alerting an operator when an exhaust air filter requires replacement or maintenance, would be desirable.

SUMMARY OF THE INVENTION

According to one embodiment of the invention, a method for operating an adhesive melter enables a predictive maintenance of an exhaust air filter used with a fill system associated with the melter. The method includes repeatedly actuating the fill system to perform a fill system cycle that refills a receiving space of the melter with solid adhesive particulate delivered with a pressurized air flow, which must then be exhausted through the exhaust air filter. The duration of each of the fill system cycles is monitored. The method also includes calculating an average duration for a plurality of the fill system cycles and detecting a change in the average duration for the fill system cycles. A user interface operatively coupled to the melter emits an alert if the detected change exceeds a maintenance threshold that is indicative of the exhaust air filter becoming clogged and requiring maintenance. Accordingly, the exhaust air filter may be replaced before the clogging stops operation of the adhesive melter.

In one aspect, the method also includes repeatedly sensing with a level sensor at the receiving space a fill level of adhesive located within the receiving space. The level sensor is capable of determining when the fill level within the receiving space crosses multiple thresholds associated with at least a nearly empty state and a nearly full state. In this regard, operation of the fill system starts to deliver solid adhesive particulate into the receiving space when the level sensor senses that the fill level has dropped below a refill threshold. Operation of the fill system stops when the level sensor senses that the fill level has exceeded a full fill threshold. The method also includes determining first and second times when the fill system starts and stops operating, respectively, from the readings of the level sensor. The difference between these first and second times provides the duration of the selected fill system cycle, which is then used to calculate the average durations that control when an alert is emitted. A controller of the adhesive melter performs the calculation of the average durations and detecting a change in the average duration such that the emission of the alert with the user interface is initiated based only on data from the level sensor and the monitoring of the durations of each of the fill system cycles. This controller process avoids false positive indications of the need for exhaust air filter maintenance that may occur when using additional sets of data from other types of sensors or equipment.

In another aspect, detecting a change in the average duration for the fill system cycles further includes identifying a predetermined number of most recently calculated average durations for a plurality of the fill system cycles. The predetermined number of most recently calculated average durations is then statistically analyzed to determine a trend line for the most recently calculated average durations. The slope of this trend line corresponds to the change in the average duration for the fill system cycles. Consequently, if the most recently calculated average durations are increasing at a slope greater than the maintenance threshold, the alert will be emitted at the user interface. The fill system is typically configured to shut down when the average duration for a plurality of the fill system cycles exceeds a maximum flow threshold that may indicate that the clogging at the exhaust air filter is preventing the fill system from keeping up with demands for more adhesive at the receiving space. Therefore, the emission of the alert is configured to be initiated before the average duration exceeds the maximum flow threshold, as this will provide a period of time (e.g., preferably a day or more) for maintenance of the exhaust air filter before shut down of the fill system would occur (and a possible shut down of the melter caused by running out of adhesive) due to clogging of the exhaust air filter. The alert can then continue to be emitted until maintenance is performed on the exhaust air filter or the fill system shuts down.

To prevent statistical outliers from affecting the analysis of the average durations for fill system cycles, the method includes additional steps for identifying and removing such statistical outliers not caused by clogging of the exhaust air filter. For example, the method may further include statistically analyzing the duration of each of the fill system cycles to identify the individual data outliers that indicate a change in the average duration for reasons unrelated to exhaust air filter clogging (e.g., a burst hose in the fill system, an obstruction in the adhesive source, a change in adhesive material used or the length of hose in the fill system). These individual data outliers are then discarded before calculating the average duration and detecting a change in the average duration for the fill system cycles. In another example, the duration for each of the fill system cycles may be evaluated until the average duration stabilizes after an initial time period following maintenance or replacement of the exhaust air filter. All data for durations of fill system cycles during this initial time period are then discarded before detecting a change in the average duration for the fill system cycles. As such, data outliers caused by events unrelated to gradual filter clogging and data outliers known to occur at the beginning of a filter's lifespan are not used to control when the alert is emitted to prompt maintenance for the exhaust air filter.

In another embodiment, an adhesive melter is configured to provide the predictive maintenance for an exhaust air filter to avoid unplanned shut downs of the fill system. The melter includes a receiving space configured to receive a supply of solid adhesive particulate that is to be melted by a heater unit, a fill system that performs fill system cycles that refill the receiving space, and the exhaust air filter which communicates with the fill system and the receiving space to exhaust pressurized air flow that carries the solid adhesive particulate into the receiving space. The melter also includes a controller that works during operation of the melter to repeatedly actuate the fill system, to monitor the duration of each fill system cycle, to calculate an average duration for a plurality of the fill system cycles, to detect a change in the average duration for the fill system cycles, and to emit an alert with a user interface if the detected change exceeds a maintenance threshold indicative of the exhaust air filter becoming clogged. As a result, maintenance or repair of the clogged exhaust air filter may be conducted before the clogging causes a shutdown of the fill system.

The adhesive melter also includes a level sensor located at the receiving space for repeatedly sensing a fill level of adhesive located within the receiving space. The level sensor, in one embodiment, includes a plate element with an electrically driven electrode and a ground electrode such that the level sensor measures a dielectric capacitance of air and adhesive acting as dielectric between the driven and ground electrodes. The dielectric capacitance varies with the fill level of the adhesive, so the level sensor can monitor when the fill level passes certain thresholds such as a refill threshold for starting operation of the fill system, or a full fill threshold for stopping operation of the fill system. The information from the level sensor may be used to determine the start and stop times and total durations of time for each fill system cycle. The controller actuates the emission of the alert based solely on data received from the level sensor, thereby avoiding false positive alerts that may occur when additional data is used for predictive maintenance.

These and other objects and advantages of the invention will become more readily apparent during the following detailed description taken in conjunction with the drawings herein.

BRIEF DESCRIPTION OF THE DRAWINGS

The accompanying drawings, which are incorporated in and constitute a part of this specification, illustrate an embodiment of the invention and, together with a general description of the invention given above, and the detailed description of the embodiment given below, serve to explain the principles of the invention.

FIG. 4 is a flowchart describing a sequence of operational steps performed by the fill system and a controller connected to the adhesive melter of FIG. 1, to thereby provide predictive maintenance alerts for clogging of the exhaust air filter of FIG. 3.

DETAILED DESCRIPTION OF THE ILLUSTRATIVE EMBODIMENTS

Referring to FIGS. 1 through 6, an adhesive dispensing system 10 in accordance with one embodiment of the invention is shown, the system 10 including an adhesive melter 12 configured to perform a method for predictive maintenance of an exhaust air filter 14 associated with the adhesive melter 12. The adhesive melter 12 operates to monitor a duration of fill system cycles used to refill the adhesive melter 12 with solid adhesive particulate, and these durations of fill system cycles are then used to determine whether an alert should be emitted regarding the immediate need for maintenance or replacement of the exhaust air filter 14. When an alert is emitted, such as on a user interface 16 operatively connected to the adhesive melter 12, the operator of the adhesive dispensing system 10 will be provided with a period of time to conduct maintenance on the exhaust air filter 14 before the exhaust air filter 14 becomes so clogged that the adhesive melter 12 cannot function properly. Accordingly, unplanned downtime for the dispensing system 10 that is caused by clogging of the exhaust air filter 14 is minimized or avoided altogether. Advantageously, the adhesive melter 12 and method described in further detail below operate to reliably provide predictive maintenance regardless of variable operating conditions at the adhesive melter 12, including, but not limited to, selective powdering of the adhesive to prevent tackiness and changes in adhesive form factor.

Figure 1:
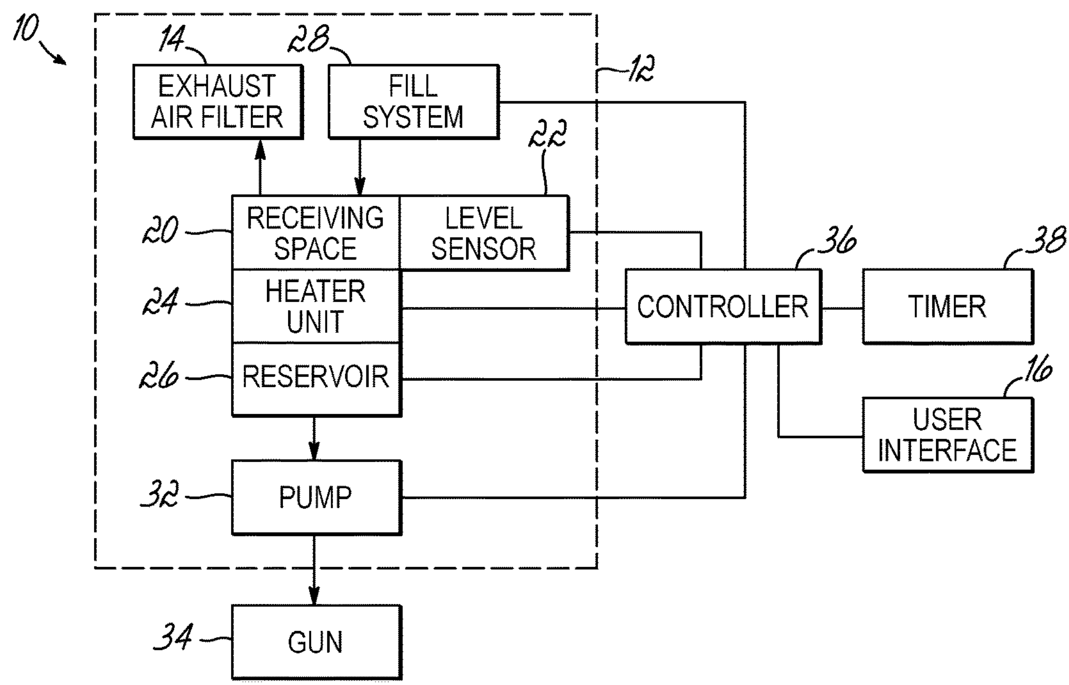
FIG. 1 is a schematic block diagram view of an adhesive dispensing system including an adhesive melter and a fill system according to one embodiment of the current invention.

Before describing the detailed operation and functionality associated with the method for providing predictive maintenance (see discussion pertaining to FIGS. 4 and 5, below), a description of the exemplary adhesive dispensing system 10 and adhesive melter 12 that perform this process will be helpful to understanding the functionality. With particular reference to FIG. 1, the adhesive melter 12 of the adhesive dispensing system 10 includes a receiving space 20 (also referred to as a "hopper" in some embodiments), a level sensor 22, a heater unit 24 receiving adhesive from the receiving space 20, and a reservoir 26 receiving adhesive melted and heated by the heater unit 24. The adhesive melter 12 of this embodiment also includes a fill system 28 operable to deliver solid or semi-solid adhesive particulate to the receiving space 20 using a pressurized air flow to refill the receiving space 20 when necessary. The adhesive melter 12 therefore also includes the exhaust air filter 14, through which the pressurized air flow from the fill system 28 and the receiving space 20 is discharged from the adhesive melter 12. This exhaust air filter 14 requires maintenance or replacement over time as a result of clogging, and the adhesive melter 12 and methods described below advantageously enable predictive maintenance of this exhaust air filter 14. It will be understood that the adhesive melter 12 may include more or fewer elements in other embodiments, including the other elements shown outside the dashed line box representing the adhesive melter 12 in FIG. 1, without departing from the scope of the invention.

As shown in FIG. 1, the adhesive melter 12 further includes a pump 32 configured to deliver heated adhesive from the reservoir 26 to a dispenser gun 34 or module. As the dispenser gun 34 operates to discharge melted adhesive from the dispensing system 10, adhesive material is removed from the adhesive melter 12, and this eventually leads to a fill system cycle operated by the fill system 28 to refill the receiving space 20 with more solid adhesive particulate. These fill system cycles are monitored to determine when an alert should be provided on the user interface 16 regarding necessary maintenance for a clogged exhaust air filter 14. It will be understood that the pump 32, fill system 28, and/or other elements may be separated from the melter 12 in some embodiments without departing from the scope of the invention.

The adhesive dispensing system 10 also includes a controller 36 operatively connected to one or more of the fill system 28, the level sensor 22, the heater unit 24, the pump 32, and the dispenser gun 34. The controller 36 includes a processor and a memory (not shown), and also program code resident in the memory and configured to be executed by the processor. As described in further detail below, the program code operates to monitor fill levels of adhesive in the receiving space 20, actuate refilling operations by the fill system 28, and then monitor these fill system cycles to determine whether an alert should be provided to the operator to prompt repair or replacement of the exhaust air filter 14. To this end, the controller 36 includes or is connected to a timer 38 configured to measure the elapsed time for fill system cycles. The timer 38 may be a separate time measurement device or a clock device configured to provide the current time to the controller 36 in embodiments where the timer 38 is not incorporated into the controller 36. The controller 36 then communicates with the user interface 16, which may be incorporated as part of the adhesive melter 12 or unrelated to the adhesive melter 12 in other embodiments, to initiate the alert for predictive maintenance. It will be understood that the predictive maintenance methods and functionality described below may be used with other types of dispensing systems and melters having a different arrangement of components, without departing from the scope of this invention.

Figure 2:
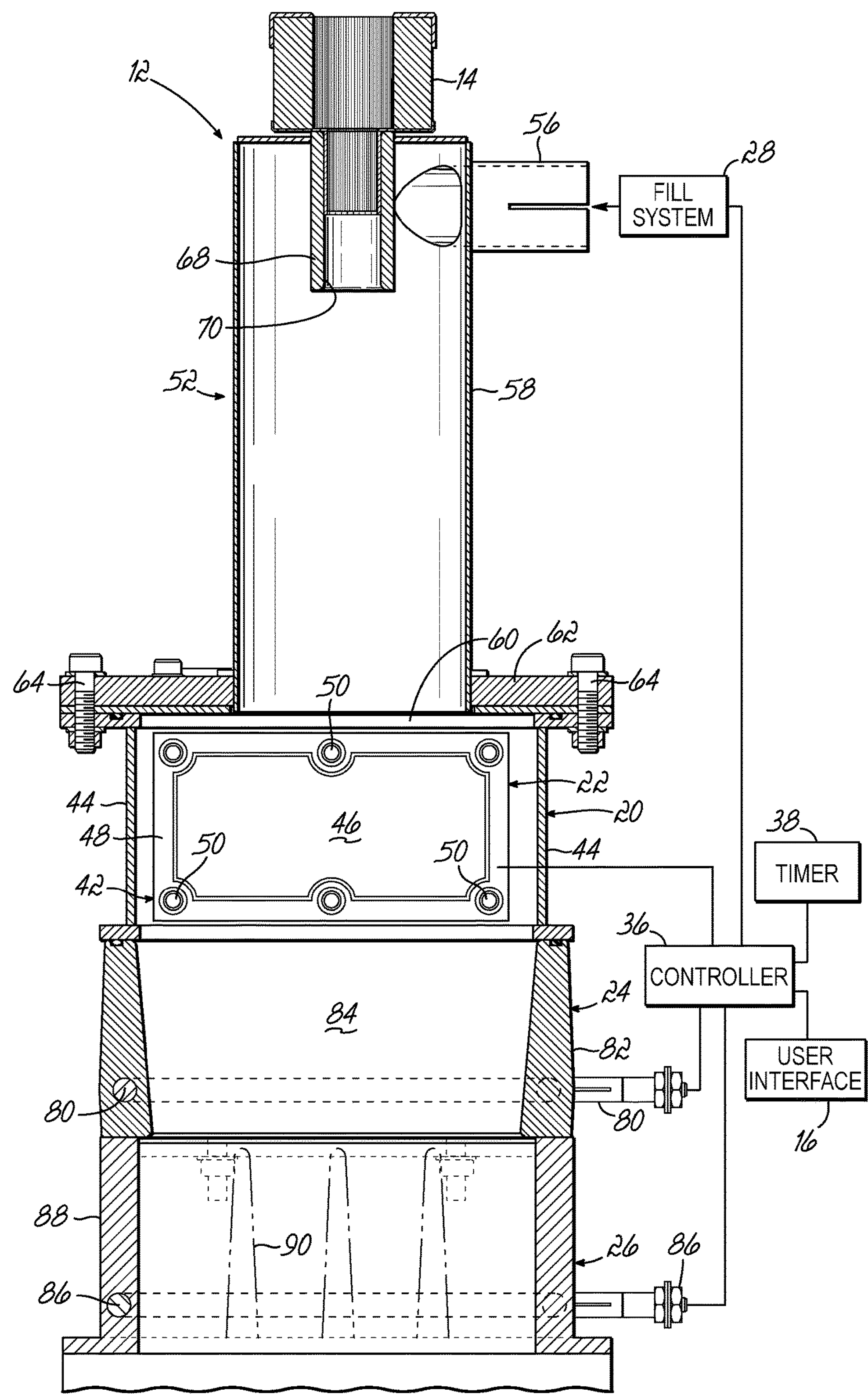
FIG. 2 is a cross-sectional front view of the adhesive melter of FIG. 1, illustrating additional features such as a level sensor in a receiving space and a cyclonic separator unit defining the inlet and the exhaust for pressurized air flow to and from the adhesive melter.
Figure 3:
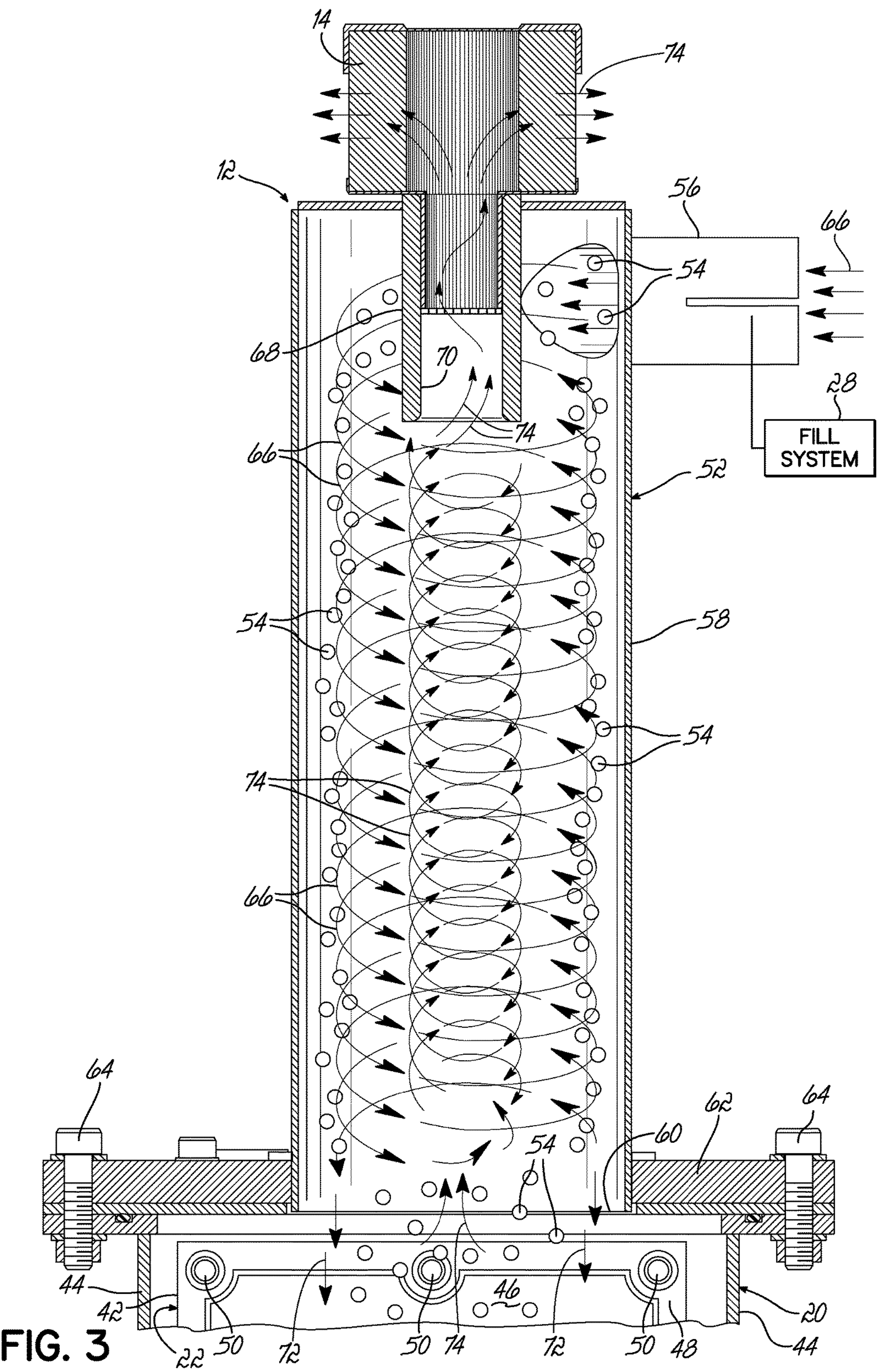
FIG. 3 is a detailed cross-sectional front view of the receiving space and cyclonic separator unit of FIG. 2, with an exemplary flow of pressurized air and solid adhesive pellets shown entering the melter and exiting through an exhaust air filter.

The exemplary embodiment of the adhesive melter 12 shown schematically in FIG. 1 is illustrated in further detail in FIGS. 2 and 3. Many of the components of the adhesive melter 12 are also described in co-pending U.S. patent application Ser. No. 13/799,622 to Clark et al., entitled "Adhesive Dispensing Device having Optimized Reservoir and Capacitive Level Sensor," the disclosure of which is hereby incorporated by reference herein in its entirety. Similarly, the specific flows of solid adhesive particulate and pressurized air flow shown in these FIGS. is also described in co-pending U.S. patent application Ser. No. 13/799,788 to Chau et al., entitled "Adhesive Dispensing Device having Optimized Cyclonic Separator Unit," the disclosure of which is hereby incorporated by reference herein in its entirety. The following description summarizes these more detailed disclosures with a particular emphasis on the structural components used to perform the predictive maintenance of the exhaust air filter 14.

With reference to FIG. 2, the receiving space 20 or hopper is mounted directly above the heater unit 24, which is in turn mounted directly above the reservoir 26. Consequently, a gravity-driven flow of adhesive is provided between the receiving space 20 where solid adhesive particulate is initially delivered and the reservoir 26 that communicates heated and melted adhesive to the pump 32 (not shown in FIGS. 2 and 3). The adhesive melter 12 is configured to operate filled with adhesive material so that the heater unit 24 is not exposed to open air for extended periods of time, which could lead to overheating of the heater unit 24 and any remaining adhesive in the melter 12. More specifically, the adhesive melter 12 is filled during normal operation such that the heater unit 24 and the reservoir 26 are completely filled with adhesive and the receiving space 20 is at least partially filled with solid or semi-solid adhesive. Therefore, the fill level of the adhesive inside the melter 12 is measured by the level sensor 22, which is located at the receiving space 20. As the fill level lowers within the receiving space 20, the controller 36 receives this information from the level sensor 22 and then actuates the fill system 28 to perform a fill system cycle and deliver solid adhesive particulate to refill the receiving space 20. This process, including sensing the fill level in the receiving space 20 and then actuating refills with the fill system 28, repeats during normal operation of the melter 12 and is the basis for performing the predictive maintenance of the exhaust air filter 14.

The level sensor 22 of the exemplary embodiment includes a capacitive level sensor in the form of a plate element 42 mounted along one of the peripheral sidewalls 44 of the receiving space 20. The plate element 42 includes a driven electrode 46 and a ground electrode 48 that is coupled to one or more of the sidewalls 44 of the receiving space 20 with plate fasteners 50 as shown. Therefore, the sidewalls 44 of the receiving space 20 also act as a portion of the ground electrode for the level sensor 22. The level sensor 22 determines the fill level of adhesive material in the receiving space 20 by detecting with the plate element 42 where the capacitance level changes between the driven electrode 46 and the ground electrode 48. To this end, open space or air in the receiving space 20 provides a different capacitance than the adhesive material in the receiving space 20. The level sensor 22 is connected with the controller 36 to provide information corresponding to the fill level passing multiple threshold levels in the receiving space (e.g., a refill threshold level where refill of the receiving space 20 should be actuated immediately and a full fill threshold level when the receiving space 20 has been sufficiently filled by the fill system 28). Alternatively, the single level sensor 22 shown in FIGS. 2 and 3 may be replaced by multiple smaller level sensors (not shown) operable to sense when the fill level in the receiving space 20 passes the relevant thresholds. Accordingly, the level sensor 22 is capable of providing signals to the controller 36 to start and stop fill system cycles with the fill system 28 to keep the receiving space 20 from becoming too empty or overfilled, and these signals can also be used to determine predictive maintenance for the exhaust air filter 14, as described in further detail below.

In this regard, the controller 36 is operatively connected to or includes the timer 38, which applies a time stamp to each instance when the level sensor 22 senses that the fill level within the receiving space 20 drops below the refill threshold or exceeds the full fill threshold. For each fill system cycle actuated by the controller 36, the difference between the time when the fill level drops below the refill threshold and the time when the fill level exceeds the full fill threshold is indicative of the duration for the fill system cycle operated by the fill system 28. As a result, the level sensor 22 and timer 38 provide sufficient data for the controller 36 to record the duration of each fill system cycle. This data is then collected together and analyzed per the methodology described below to determine when the exhaust air filter 14 is becoming clogged and requires maintenance or replacement. This functionality of the controller 36 uses information that is already required to keep the receiving space 20 and melter 12 filled with sufficient adhesive during operation, so no additional air flow or pressure sensors are necessary within the adhesive melter 12.

As shown in FIGS. 2 and 3, a cyclonic separator unit 52 may be mounted on top of the receiving space 20 in the exemplary embodiment of the adhesive melter 12. The cyclonic separator unit 52 receives adhesive pellets 54 or other solid adhesive particulate driven by a pressurized air flow through an inlet hose (not shown) leading to the fill system 28. To this end, the inlet hose connects to a tangential inlet pipe 56 that communicates with a generally cylindrical pipe 58 extending from the tangential inlet pipe 56 to an opening 60 at the top of the receiving space 20. The generally cylindrical pipe 58 may include a mounting plate 62 configured to be coupled to the sidewalls 44 of the receiving space 20 using bolt fasteners 64 or other connecting elements, as shown. Consequently, the incoming flow of adhesive pellets 54 and pressurized air flow is directed to spiral downwardly through the generally cylindrical pipe 58 towards the receiving space 20 as shown by first flow arrows 66 in FIG. 3. It will be understood that the cyclonic separator unit 52 decelerates the speed of the pressurized air flow and the incoming adhesive pellets 54 before those adhesive pellets 54 are delivered into the receiving space 20, and this reduction in speed minimizes any splashing of liquid adhesive that may be within the receiving space 20. The receiving space 20 is sealed from the environment upstream from the heater unit 24 but for the connection to the cyclonic separator unit 52, so the cyclonic separator unit 52 also includes an exhaust pipe 68 proximate to the tangential inlet pipe 56 for removing the pressurized air flow from the receiving space 20.

To this end, the tangential inlet pipe 56 defines the inlet into the receiving space 20, and the exhaust pipe 68 defines the outlet from the receiving space 20. The exhaust pipe 68 therefore defines an internal passage 70 sized to receive the exhaust air filter 14 used with the exemplary embodiment of the adhesive melter 12. The incoming flow of air and pellets 54 shown by the first flow arrows 56 is separated at or near the receiving space 20 such that the adhesive pellets 54 drop into the receiving space 20 as shown by second flow arrows 72 and the pressurized air flow reverses direction and flows upwardly within the generally cylindrical pipe 58 and through the exhaust pipe 68 and exhaust air filter 14 back to the surrounding environment, as shown by third flow arrows 74. In this regard, all of the pressurized air flow exiting the receiving space 20 and the adhesive melter 12 passes through the exhaust air filter 14 such that any adhesive vapors, powder, or other contaminants may be removed from the outgoing exhaust flow.

The amount of contaminants that must be removed with the exhaust air filter 14 can vary significantly between fill system cycles as a result of various factors, including the form factor or shape defined by the solid adhesive particulate and whether the solid adhesive particulate is powdered to avoid sticking together upstream from the fill system 28. The operator of the adhesive melter 12 likely has very little or no control over these varying operating conditions, so it is difficult to predict how quickly the exhaust air filter 14 will clog over time. However, the predictive maintenance enabled by the process described below automatically adjusts to the varying operating conditions, thereby overcoming the problems previously encountered when using exhaust air filters 14 that unexpectedly clog and cause unplanned downtime for the adhesive melter 12. More particularly, an alert is provided on a user interface 16, either located at the melter 12 or some other convenient location, to prompt the operator to repair or replace the exhaust air filter 14 before the clogging causes an unplanned shutdown of the fill system 28 (and also potentially a later shutdown of the melter 12).

To summarize the functionality, the adhesive melter 12 operates by having the controller 36 actuate heating and melting of adhesive with at least one heater element 80 located in sidewalls 82 and/or partitions 84 of the heater unit 24 and with at least one heater element 86 located in sidewalls 88 and/or fins/partitions 90 of the reservoir 26. As the heated adhesive is drawn out of the reservoir 26 by the pump 32, the level sensor 22 detects the need to refill the receiving space 20 and the controller 36 actuates the fill system 28 to provide more solid adhesive particulate through the cyclonic separator unit 52. The pressurized air flow generated during a fill system cycle is then exhausted through the cyclonic separator unit 52 and the exhaust air filter 14. The controller 36 uses information from the level sensor 22 and the timer 38 to statistically analyze the data regarding fill system cycle durations and thereby determine any change in the average duration for fill system cycles, which provides the information necessary to determine when maintenance of the exhaust air filter 14 will be required. For example, the "change" that is determined may include changes in duration over multiple cycles or the rate of change of such changes in duration (e.g., a second derivative analysis) in some embodiments. One specific method programmed into the controller 36 for performing this analysis and predictive maintenance is described in further detail below, but it will be understood that the exemplary embodiment of the adhesive melter 12 shown in FIGS. 1 through 3 may be modified in other embodiments without departing from the scope of the invention.

Now turning to FIG. 4, the controller 36 is configured to perform the series of operations defining the predictive maintenance process according to one embodiment of the invention, this series of operations being labeled with reference number 400 in the Figure. The series of operations begins by starting the timer 38 at a time t=0 (block 402). This variable t will be used to time stamp the beginning and end of fill system cycles as briefly described above. The controller 36 operates the melter 12 to provide hot melt adhesive to the remainder of the adhesive dispensing system 10 (block 404). This adhesive melter operation includes the heating and melting of solid particulate adhesive as the heated adhesive is removed using the pump 32 or the dispenser gun 34. After a period of operation, the fill level of adhesive within the receiving space 20 will drop below a refill threshold that indicates a refill is necessary to avoid uncovering the heater unit 24. Once the level sensor 22 detects that the fill level within the receiving space 20 has dropped below this refill threshold, the controller 36 actuates the fill system 28 to perform a fill system cycle and thereby refill the receiving space 20 with more adhesive (block 406). The fill system 28 will deliver adhesive pellets 54 in a pressurized air flow into the receiving space 20 as described in detail above.

The fill system 28 is configured to continue delivering adhesive pellets 54 and pressurized air flow until one of two conditions occur: the fill system 28 has been running for a maximum cycle time (e.g., 10 seconds in some embodiments), or the level sensor 22 detects that the receiving space 20 is filled. To this end, the level sensor 22 also senses when the fill level of adhesive within the receiving space 20 exceeds a full fill threshold, at which point the controller 36 knows the receiving space 20 is filled and the operation of the fill system 28 can be stopped. While the controller 36 has been actuating the fill system cycle to start and stop, the timer 38 has been applying a time stamp based on the time t when the level sensor 22 detected the fill level dropping below the refill threshold (i.e., when the fill system cycle started) and the time t when the level sensor 22 detected the fill level exceeding the full fill threshold (i.e., when the fill system cycle stopped). As discussed above, this example of a running timer 38 may instead be replaced with a timing device internal to the controller 36 or a global clock that provides current time information in other embodiments of the invention. The controller 36 receives these data from the timer 38 and determines an elapsed cycle time or "duration" for the fill system cycle, this elapsed cycle time being the difference between these time values monitored by the timer 38 (block 408). The fill system cycle and its duration are stored as a data point in the memory associated with the controller 36, and the specific time t when the fill system cycle was operated may also be stored as a part of this data point (block 410). Therefore, over the course of operation, these steps at blocks 406 through 410 can be reused to monitor and store the duration of each fill system cycle.

In the exemplary embodiment shown in FIG. 4, the controller 36 may be operated in a plurality of modes, including, but not limited to, a startup mode and a monitoring mode. The startup mode is used to calibrate the readings for fill system cycle durations during an initial period of time such as a few days or a week following the installation of a new exhaust air filter 14. This startup mode ensures that the fill system cycle durations have stabilized and also ensures that sufficient data is collected for the analysis described below. The monitoring mode follows the startup mode and includes this analysis of the fill system cycle durations. It will be understood that the controller 36 may perform the foregoing and following functions without specifically operating in distinct modes such as these in other embodiments, but these modes will assist in understanding the operation of the adhesive melter 12.

Thus, in the exemplary embodiment the controller 36 next determines whether the startup mode is active (block 412). If the startup mode is active, then the controller 36 determines a total number of fill system cycles that have been run during the startup mode (block 414). This total number should be equivalent to the number of data points stored during this mode. The controller 36 determines if this number of fill system cycles provides sufficient data to generate an average duration for the fill system cycles (block 416). This determination may be based on prior testing that determines how many fill system cycles generally need to be performed before the cycle duration stabilizes from the initial unpredictability caused early in the lifespan of the exhaust air filter 14. For example, the first few days of fill system cycles may be required before a reliable average duration for a plurality of the fill system cycles can be calculated. This sufficient data may be a predetermined set number of data points or a set period of time t that the melter 12 has to be operated during the startup mode. Thus, if sufficient data has not been collected at step 416, the process returns to block 406 to actuate the fill system 28 again once the level sensor 22 detects that a refill of the receiving space 20 is required. This collection of data repeats until sufficient data has been collected.

Once the controller 36 determines at step 416 that sufficient data has been collected during the startup mode, the controller 36 proceeds to remove any data outliers that fall outside a predetermined deviation (such as one or more standard deviations) from the remainder of the stored data (block 418). This identification of data outliers is conducted using known statistical analysis methods such as the calculation of a standard deviation and a determination of which data points fall outside the standard deviation. In addition to statistical outliers caused by occurrences unrelated to filter clogging (e.g., caused by a burst hose in the fill system, an obstruction in the adhesive source, a change in adhesive material used or the length of hose in the fill system), a predetermined number of the initial fill system cycles may also be removed during this process to avoid the use of unreliable data known to occur during the first few days of operation with a new exhaust air filter 14. In another example, a series of consecutive fill system cycles having maximum duration may be discarded because this likely indicates an initial filling of the melter 12 from an empty condition. The statistical analysis performed on the data in step 418 is programmed and tailored to leave only those data points which will be reliable and helpful in determining the gradual clogging of the exhaust air filter 14.

With the remaining data from the startup mode, the controller 36 calculates the average duration for a plurality of fill system cycles (block 420). This average duration represents a baseline that will change over time as the exhaust air filter 14 becomes more clogged, as the fill system 28 will not be able to generate and exhaust as much pressurized air flow as the exhaust air filter 14 becomes more clogged. To this end, the average duration for the plurality of fill system cycles is ready to be analyzed over time and further fill system cycles to determine when the clogging of the exhaust air filter 14 is adversely affecting the operation of the fill system cycles. Following this initial calculation of the average duration, the controller 36 ends the startup mode and begins the monitoring mode (block 422), at least in those embodiments having distinct modes of operation. The controller 36 then returns to step 402 to reset the timer 38 back to zero for the monitoring mode.

While in the monitoring mode, the controller 36 will determine at step 412 (following another detection and storage of an elapsed cycle time for a fill system cycle) that the startup mode is not active. In this circumstance, the controller 36 proceeds by identifying a group of the stored data points for testing whether a significant change in the average duration for fill system cycles has occurred (block 424). This identified group of data may include a predetermined number of the most recently stored data in the memory, for example. In other words, the controller 36 may have access to monitored durations for fill system cycles extending back to the beginning of use for the exhaust air filter 14, but trends or changes in the average duration for fill system cycles will be best revealed when analyzing only a set number of more recent data. The identification of which data to use in the following analysis may be modified in other embodiments as well depending on the preferences of the operator.

Figure 5:
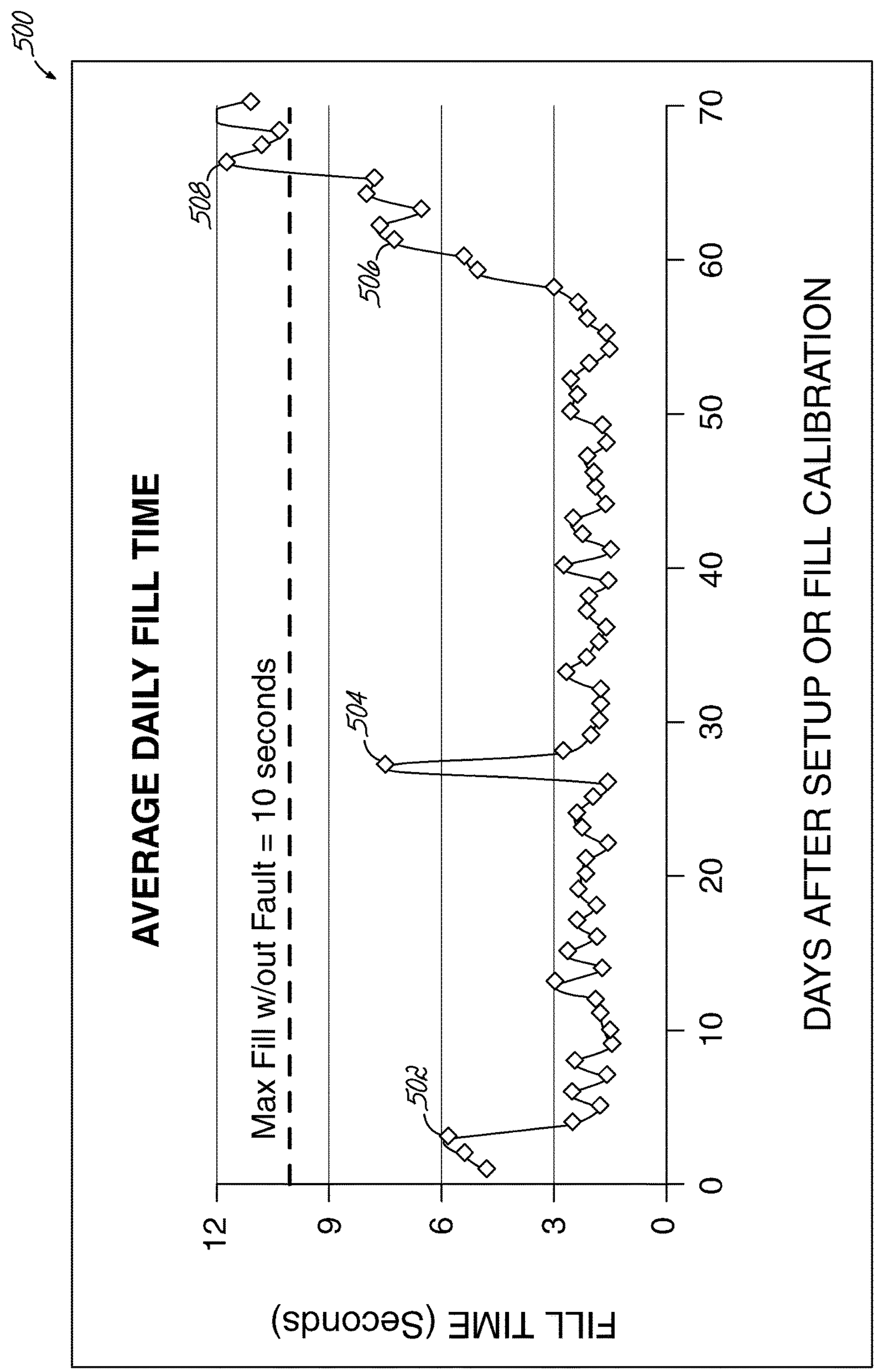
FIG. 5 is a time graph showing trends of an average daily fill time obtained using the sequence of operational steps of FIG. 4, to explain how the predictive maintenance alerts are triggered.

Once the group of data for the test has been identified, the controller 36 removes any data outliers that fall outside a predetermined deviation from the remainder of the group of data (block 426). This removal typically follows similar statistical analysis rules as those described above with reference to step 418. In another example of removing such data outliers, the data may indicate a change from a plurality of fill system cycles with a stable average duration about 3.0 seconds to another plurality of fill system cycles with a stable average duration of about 5.0 seconds. Such a change is likely caused by factors unrelated to filter clogging, including a change in hose length between an adhesive source and the melter 12 or a change in adhesive material used, so the statistical analysis would disregard the older fill system cycles with the stable average duration of about 3.0 seconds in step 426 for this example. The controller 36 then statistically analyzes the remaining data and formulates a trend line for the data (block 428). The formulation of a "trend line" is described for exemplary purposes only, as the controller 36 does not necessarily need to plot all of the data onto a graph to identify any trends in the duration data over time. If the controller 36 did produce a plot of the data on a graph, a sample of such a plotting of data (without a trend line) is shown in FIG. 5, which is discussed in further detail below. The trend line defines a slope that will correspond to "a change" in the average duration of fill system cycles over the selected predetermined number of most recently performed fill system cycles. This detected "change" could be the general increase of average duration from cycle to cycle, the rate of change of the changing average duration (e.g., a second derivative analysis), or some similar indicator of hampered performance by filter clogging. The specific statistical analysis chosen for step 428 may be chosen based on the desires of the operator or end user. Regardless of how the "change" is defined, the controller 36 calculates the slope of the trend line relative to the average duration and sets this slope as a variable Δ (block 430).

The controller 36 then determines whether the variable Δ is greater than or equal to a predetermined maintenance threshold value that indicates clogging of the exhaust air filter 14 and an imminent need to replace or perform maintenance on the exhaust air filter 14 (block 432). The predetermined threshold value is set based on a plurality of factors, such as previous test data that shows the typical increase in fill system cycle duration over time. This maintenance threshold also depends on the type of statistical analysis being performed to identify the change in the durations of fill system cycles. For example, the change in the average duration may be required to exceed a 4-5% increase per fill system cycle in one embodiment, although it will be understood that a slope or variable Δ of greater than 1% per fill system cycle may be sufficient to determine significant filter clogging. Regardless of what criteria is used to set the predetermined threshold value, the detection of whether the variable Δ exceeds this value is tailored to provide an early indication of when the exhaust air filter 14 requires maintenance, thereby identifying a potential problem in advance of an automatic shutdown of the fill system 28.

If the variable Δ does not exceed the predetermined threshold value at step 432, then the controller 36 returns to step 406 to begin another fill system cycle when a refill is again required in the receiving space 20. The process of monitoring the duration of the next fill system cycle and detecting a change in the average duration of a plurality of fill system cycles repeats until clogging at the exhaust air filter 14 is determined by this process. In this regard, if the variable Δ does exceed the predetermined threshold value at step 432, then the controller 36 initiates an alert 522 on a display screen 520 of the user interface 16 (see FIG. 6 and discussion below) that informs an operator of the need to replace the exhaust air filter 14 (block 434). Generally, the alert 522 is maintained until the clogging of the exhaust air filter 14 causes an automatic shutdown of the fill system 28 or the operator conducts maintenance on the exhaust air filter 14, typically by replacement of the exhaust air filter 14. Once the maintenance occurs, the controller 36 ends the monitoring mode and begins the startup mode again (block 436), and then returns to step 402 to reset the timer 38 to zero for the new startup mode. This process continuously cycles between the modes as each exhaust air filter 14 is installed and used to the point where the clogging significantly affects the ability of the fill system 28 to sufficiently refill the adhesive melter 12.

Accordingly, the series of operations included in the process 400 shown in FIG. 4 is one embodiment that enables predictive maintenance alerts to be generated for clogging of the exhaust air filter 14. Furthermore, these predictive maintenance alerts are based solely on the time measured for the plurality of fill system cycles operated by the fill system 28, as this information is sufficient by itself to reliably determine when the exhaust air filter 14 is clogging to the extent of deteriorating performance for the fill system 28. Therefore, additional sensors do not need to be added to the adhesive melter 12, and in fact, such additional sensors would be undesirable because the analysis using those sensors may lead to more false positive tests for clogging (e.g., resulting in filters being replaced before being clogged at the end of a lifespan). The information provided by the level sensor 22 and the timer 38 is sufficient for the controller 36 to make a reliable determination regarding when the exhaust air filter 14 is becoming clogged and needs replacement. It will be understood that the process 400 described above may be modified in several aspects without departing from the scope of the invention, so long as the adhesive melter 12 continues to provide the predictive maintenance alerts.

A sample representation of the data collected during the beneficial operation of the adhesive melter 12, while using the series of operations shown in FIG. 4 is illustrated in graphical form in FIG. 5. To this end, FIG. 5 illustrates a graphical plot 500 of average daily fill times (shown as daily averages rather than raw data on each fill system cycle, for simplicity) against the number of days since the exhaust air filter 14 was most recently replaced, which corresponds to the current lifespan of the exhaust air filter 14. These average daily fill times provide a typical series of data that may be encountered when performing the analysis process with the controller 36 as described above. As described above, the controller 36 does not necessarily generate such a plot or graph during the statistical analysis, but this plot is helpful in understanding how the statistical analysis identifies trends that appear to be caused by filter clogging. It will be understood that these data points are provided from sample lab testing for descriptive purposes only and shall not be deemed to limit the invention in any substantial way.

As shown in FIG. 5, the plot 500 of the average daily fill times begins with a series of average durations that are relatively high (about 5-6 seconds) at point 502. Then average durations then drop to a relatively stable value over the next few days of about 2-3 seconds. This initial higher set of average durations are a result of the startup period as described above, and these data should be removed from the analysis when the controller 36 begins monitoring whether the average durations are changing in such a way to indicate filter clogging. Although the average daily fill times change from day to day, the average durations calculated by the controller 36 remain largely within the 2-3 second window over a period of about 60 days. One exception is a spike at point 504, but this data point 504 stands out as a statistical outlier when reviewing the plot 500 of data as a whole. Therefore, using the statistical analysis described above, the data point at 504 would be eliminated from the repeated evaluation of whether the fill system cycles are changing in duration. More specifically, the data point 504 is likely an aberration caused by factors other than clogging of the exhaust air filter 14, as such clogging over time does not tend to have an immediate effect like that data point 504 would show. For example, the spike in duration may be caused by a hose bursting at the fill system 28 or a temporary running out or obstruction of adhesive at the source feeding the fill system 28 (these types of events may also shut down the fill system 28, but not for reasons related to filter clogging). As such, the controller 36 will determine that the change in average durations for fill system cycles is not significant in this first 60 day window.

However, after day 60 the average daily fill times begin to increase relatively rapidly over the remainder of the lifespan of the exhaust air filter 14. After a few consecutive increases in the average duration for the fill system cycles, such as at point 506, the variable Δ for the slope of the trend line would exceed the corresponding predetermined threshold value as a result of the deteriorating performance shown in the average daily fill times. In the example shown in FIG. 5, a small series of 3-5 most recent average daily fill times may be considered in the detection of changing average durations. However, it will be understood that the average duration may be calculated after each fill system cycle, and a higher number (e.g., when the adhesive melter 12 performs 20 refills per hour or more) of these average durations could be analyzed in other embodiments of the invention to detect a sufficient increase or change in average durations. In the example shown in FIG. 5, the slope or variable Δ that the controller 36 may test for is an increase of more than 1 second per day in the average daily durations over 3 or more days. Such a predetermined threshold will cause initiation of the alert 522 at a relatively early point like 506 in the clogging of the exhaust air filter 14, and this would provide a period of a few days before the clogging led to an average daily fill time of over 10 seconds at data point 508, at which point an automatic shutdown of the fill system 28 would occur. To this end, the sample data shown in FIG. 5 would provide up to 5 days of alert or notification to change the exhaust air filter 14 before an unplanned downtime would occur. That time period advantageously provides predictive maintenance for the exhaust air filter 14 in a reliable and repeatable manner.

Figure 6:
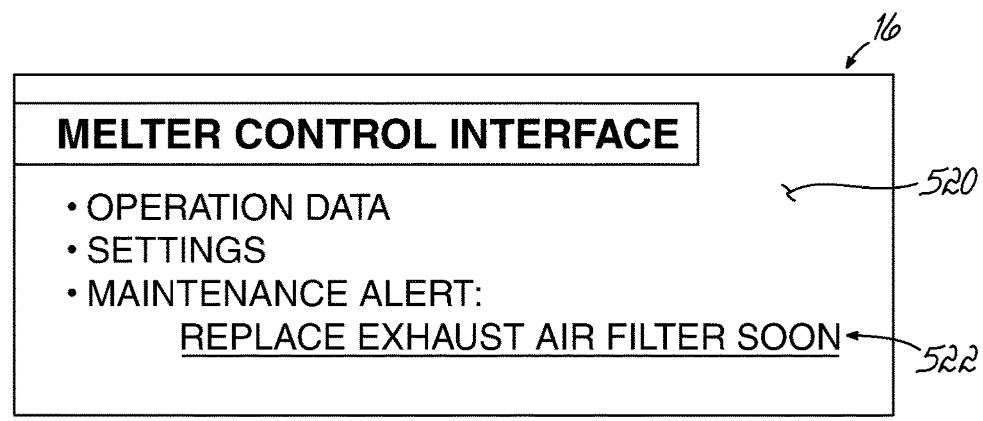
FIG. 6 is a schematic representation of a user interface of the adhesive dispensing system of FIG. 1, showing an exemplary maintenance alert for replacing the exhaust air filter.

With reference to FIG. 6, the user interface 16 according to the exemplary embodiment of the adhesive dispensing system 10 is shown. As discussed above, this user interface 16 may include a display screen 520 located at the adhesive melter 12 itself or at some other convenient location such as a control room. The user interface 16 will provide multiple pieces of information pertaining to operational data and settings being used for the components of the melter 12 and the dispensing system 10, so this is also a convenient location for the alert 522 to be displayed to an operator. As shown in FIG. 6, the alert 522 is tailored to draw the immediate attention of the operator, and the alert 522 could be presented in a different font, color, or with a flashing display to further enhance the visibility of the alert 522. In addition, an audible signal may also be emitted if desired. An operator interacting with the display screen 520 will readily understand from the clear statement of the alert 522 what maintenance needs to occur. To this end, the maintenance alerts for the exhaust air filter 14 may be formatting similarly to other component maintenance alerts that occur after a certain period of operational cycles (such as for a pump 32) or a similar monitoring metric. The process and dispensing system 10 described above advantageously provide predictive maintenance for these exhaust air filters 14, which is a feature not provided in conventional adhesive systems.

In addition, the predictive maintenance enabled by the process and dispensing system 10 of this invention operates reliably regardless of changing operational conditions present in most adhesive dispensing systems 10. More particularly, during a hotter time of year when more powdering of solid adhesive particulate is done by suppliers, the lifespan of the exhaust air filter 14 will shorten significantly, but it will still exhibit a period of time where the average durations of fill system cycles stays about the same followed by a period of time with a discernable steady increase in the average durations of fill system cycles as the exhaust air filter 14 becomes more clogged. Therefore, no matter whether the total lifespan of the exhaust air filter 14 is 30 days or 90 days, the increase in average durations for fill system cycles will be detected and an alert emitted in advance of the automatic shutdown of the fill system 28 caused by excessive clogging of the exhaust air filter 14. The adhesive dispensing system 10 therefore enables predictive maintenance of exhaust air filters 14 that minimizes or eliminates unplanned downtime that are caused by clogging of these filters in conventional systems.

While the present invention has been illustrated by a description of several embodiments, and while those embodiments have been described in considerable detail, there is no intention to restrict, or in any way limit, the scope of the appended claims to such detail. Additional advantages and modifications will readily appear to those skilled in the art. Therefore, the invention in its broadest aspects is not limited to the specific details shown and described. The various features disclosed herein may be used in any combination necessary or desired for a particular application. Consequently, departures may be made from the details described herein without departing from the spirit and scope of the claims which follow.

What is claimed is:

1. An adhesive melter, comprising:

a receiving space configured to receive a supply of solid adhesive particulate;

a heater unit configured to receive the solid adhesive particulate from the receiving space and melt the solid adhesive particulate into melted adhesive;

a fill system coupled to said receiving space and performing fill system cycles that refill said receiving space with solid adhesive particulate and a pressurized air flow;

an exhaust air filter communicating with said fill system and said receiving space, said exhaust air filter exhausting the pressurized air flow from said receiving space during fill system cycles; and a controller operatively coupled to said fill system and configured to:

repeatedly actuate said fill system, monitor a duration of each fill system cycle performed by said fill system, calculate an average duration for a plurality of the fill system cycles, detect a change in the average duration for the fill system cycles, and generate a signal if the detected change exceeds a maintenance threshold indicative of said exhaust air filter becoming clogged and requiring maintenance.

2. The adhesive melter of claim 1, further comprising:

a level sensor located in said receiving space, said level sensor repeatedly sensing a fill level of adhesive located within said receiving space, wherein said controller is configured to actuate said fill system by starting operation of said fill system when said level sensor senses that the fill level has dropped below a refill threshold and by stopping operation of said fill system when said level sensor senses that the fill level has exceeded a full fill threshold.

3. The adhesive melter of claim 2, wherein the level sensor comprises multiple level sensors in said receiving space.

4. The adhesive melter of claim 2, wherein said receiving space is at least partially defined by a sidewall, and said level sensor further comprises:

a plate element;

an electrically driven electrode located on said plate element; and a ground electrode located on said plate element, the ground electrode being electrically connected to said sidewall such that said sidewall forms at least a portion of said ground electrode, and said ground electrode being electrically connected to said electrically driven electrode for measuring a dielectric capacitance of air and adhesive between said electrically driven and ground electrodes.

5. The adhesive melter of claim 2, wherein said controller is configured to generate the signal based solely on data received from said level sensor.

6. The adhesive melter of claim 2, wherein the controller is configured to monitor the duration of each fill system cycle performed by said fill system by:

detecting a first time when the level sensor senses that the fill level has dropped below the refill threshold and a second time when the level sensor senses that the fill level has exceeded the full fill threshold;

calculating a difference between the first time and the second time, the difference corresponding to the duration of the selected fill system cycle; and repeating the detecting and calculating a difference steps for each of the fill system cycles.

7. The adhesive melter of claim 1, wherein said controller is configured to detect the change in the average duration for the fill system cycles by:

identifying a predetermined number of most recently calculated average durations for the plurality of the fill system cycles, analyzing the predetermined number of most recently calculated average durations over time to determine a trend line for the most recently calculated average durations, and calculating a slope of the trend line to detect the change in the average duration for the fill system cycles.

8. The adhesive melter of claim 1, wherein the controller is configured to shut down the fill system if the average duration for the plurality of fill system cycles exceeds a maximum flow threshold.

9. The adhesive melter of claim 8, wherein said controller is configured to generate an alert before the average duration for the plurality of fill system cycles exceeds the maximum flow threshold to provide a period of time for maintenance of said exhaust air filter before shut down of the fill system.

10. The adhesive melter of claim 1, further comprising a user interface in electrical communications with the controller, wherein the controller is configured to generate the signal by generating an alert signal for transmission to the user interface if the detected change exceeds the maintenance threshold indicative of said exhaust air filter becoming clogged and requiring maintenance.

11. The adhesive melter of claim 10, wherein the user interface comprises a display, and the display is configured to display an alert in response to reception of the alert signal.

12. The adhesive melter of claim 10, wherein the user interface comprises a speaker, and the speaker is configured to emit an alert in response to reception of the alert signal.

13. The adhesive melter of claim 10, wherein the controller is configured to continue generating the alert signal until either maintenance is performed on the exhaust air filter or the fill system shuts down.

14. The adhesive melter of claim 1, wherein the controller is further configured to:

analyze the duration of each of the fill system cycles to identify outliers; and discard the outliers before calculating the average duration for the plurality of the fill system cycles.

15. The adhesive melter of claim 1, wherein the controller is further configured to:

determine that maintenance has been performed on the exhaust air filter;

evaluate a duration of each of the fill system cycles for an initial time period following maintenance of the exhaust air filter until the average duration for a plurality of fill system cycles stabilizes; and discard the durations of the fill system cycles during the initial time period.

16. The adhesive melter of claim 1, wherein the fill system is at an ambient temperature to maintain the adhesive particulate as solid adhesive particulate.

17. The adhesive melter of claim 1, further comprising a reservoir holding the melted adhesive melted by the heater unit.

18. The adhesive melter of claim 17, further comprising:

a dispenser configured to discharge the melted adhesive on a substrate; and a pump configured to deliver the melted adhesive from the reservoir to the dispenser.

19. The adhesive melter of claim 1, further comprising a cyclonic separator mounted to an inlet of the receiving space.

* * * * *